March 25, 1969 N. KURDYLA 3,435,332
TEMPERATURE COMPENSATING MECHANISM FOR HALL EFFECT DEVICE
Filed July 5, 1966 Sheet 1 of 2
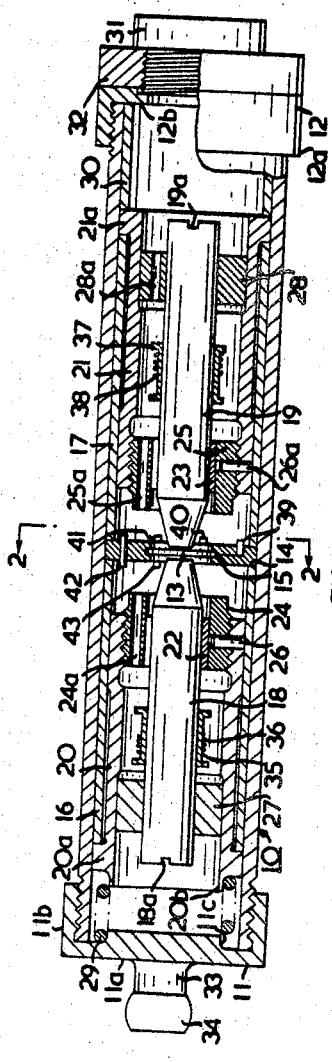
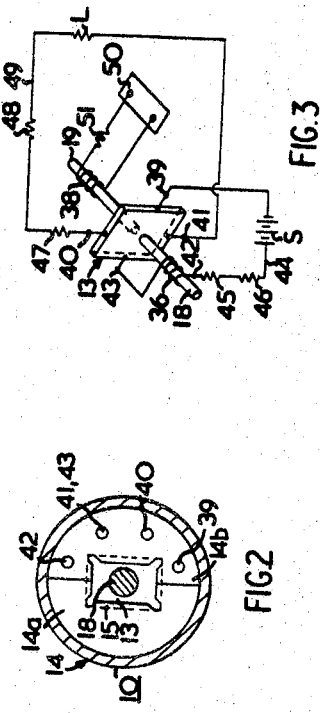
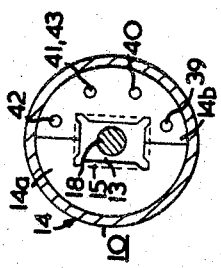
INVENTOR
NICHOLAS KURDYLA

United States Patent Office

3,435,332
Patented Mar. 25, 1969

3,435,332
TEMPERATURE COMPENSATING MECHANISM FOR HALL EFFECT DEVICE
Nicholas Kurdyla, Pierrefonds, Quebec, Canada, assignor to Canadair Limited, Quebec, Quebec, Canada, a corporation of Canada
Filed July 5, 1966, Ser. No. 562,790
Claims priority, application Canada, Apr. 27, 1966, 958,964
Int. Cl. H02m *3/06, 5/06;* H01c *1/16*
U.S. Cl. 323—94                                   14 Claims

ABSTRACT OF THE DISCLOSURE

A Hall effect device including a Hall plate mounted in an air gap between adjacent ends of a pair of high permeability axially aligned rods which lie in a magnetic path passing through the Hall plate and which serve to concentrate a component of a magnetic field on the latter. The high permeability rods are mounted in a specialized structure designed such that a temperature increase or decrease affecting the Hall plate output causes expansion and contraction of the structure thereby varying the air gap between the high permeability rods and hence varying the effective permeability of the above mentioned magnetic path. The structure referred to above is designed such that the effective permeability variation effectively opposes the effects of the temperature variation on the Hall plate output.

---

This invention relates in general to a Hall effect device and in particular to a Hall effect generator having a structure especially adapted for temperature compensation of the Hall output thereof.

The theory of operation of the Hall effect generator is, in general, well known in the art. Briefly, if a block of a suitable material (for practical results a semiconducting material) having axes $x, y, z$ is fitted with a pair of input electrodes such that an input control current $I_x$ flows along the $x$-axis thereof, and if a magnetic field having flux density B is passed through the semiconductor generally parallel to the $y$-axis thereof, then a Hall voltage $V_z$ will be produced across the semiconductor in the direction of the $z$-axis. A pair of output electrodes may be connected to the semiconductor such that the Hall voltage can be applied across an output circuit. The magnitude of the Hall voltage developed by the generator may be expressed mathematically as:

$$V_z = \left(\frac{R}{d}\right) B I_x + C I_x \quad (1)$$

$$= \left(\frac{R}{d}\right) \mu H I_x + C I_x \quad (2)$$

where R is the Hall constant of proportionality, $d$ is the thickness measured along the $y$-axis of the semiconductor, $\mu$ is the effective permeability of the magnetic path passing through the Hall plate (to obtain practical results at least one high permeability magnetic field concentrator rod is disposed in this path to increase the effective magnetic field at the Hall plate), $I_x$ is the input control current; H is the component of magnetic field intensity passing through the semiconductor and parallel to the $y$-axis thereof; C is a constant; B is the magnetic flux density.

If it is assumed that R, $d$, and $\mu$ can be kept constant, the output voltage $V_z$ is proportional only to H and $I_x$. Since $I_x$ and $V_z$ can be accurately measured, H may be determined from the equation above by a suitable transposition of terms.

In use, the input electrodes of the semiconducting block (known as a Hall plate) are connected to a regulated source of potential such that the input current through said Hall plate may be readily controlled. The output of the Hall plate is tapped by a pair of electrodes (known as Hall electrodes) and said output is fed through a load or output circuit such that a useful result may be obtained therefrom. In order to obtain a Hall output that is sufficiently large in magnitude, it is known in the art to mount the Hall plate in an air gap between adjacent ends of a pair of high permeability aligned rods, the latter serving to concentrate a component of an ambient magnetic field on the faces of the Hall plate.

In many applications, it is highly desirable that the Hall generator output be linear with respect to the value of the strength of the magnetic field H applied thereto. Unfortunately however, the Hall generator and its output circuit are often exposed, while in use, to fluctuations in temperature. This is particularly true when the Hall generator is used on an aircraft; in this case the ambient temperature to which the Hall generator and its output circuit are exposed may vary in the range from $-55°$ C. to $+70°$ C. It is well known that temperature change has an adverse affect upon the output of the Hall generator. This is due to the fact that the Hall constant of proportionality R, the resistance of the Hall plate, and the resistance in the output circuit are all temperature dependent. It is therefore apparent that some means for temperature-compensating the output of the Hall generator is necessary if a linear generator output with respect to magnetic field strength is to be obtained.

In the past, attempts have been made to balance out the temperature variations in the Hall constant R, in the Hall plate resistance, and in the output circuit resistance by inserting a negative temperature coefficient resistance in the load circuit. However, these attempts have not always proven successful since the resistance value required to provide proper temperature compensation of the Hall generator output was often higher than was tolerable from the output current requirement point of view.

The main object of the present invention is to provide for accurate temperature compensation of the Hall generator output, while at the same time providing for a greater generator power output as compared with the output of an equivalent generator working under the same conditions and having conventional temperature compensating means. Other objects of the invention will become apparent as the description thereof proceeds.

As stated previously, it is known in the art to mount the Hall plate of the Hall generator in an air gap between the adjacent ends of a pair of high permeability axially aligned rods which lie in a magnetic path passing through the Hall plate and which serve to concentrate a component of a magnetic field on the Hall plate. The generator of the present invention incorporates the above structure in a manner such that temperature compensation of the Hall generator output is achieved. It will be realized that any change in the air gap between the concentrator rods will vary the value of the effective permeability of the magnetic path passing through the Hall plate. In accordance with the present invention the concentrator rods are supported in a structure designed such that a temperature increase or decrease affecting the Hall plate (and hence the generator output) will result in expansion or contraction of said structure thereby varying the air gap referred to and varying the effective permeability of said magnetic path. Since the Hall voltage output of the generator is directly proportional to the effective permeability $\mu$ of the magnetic path (see Equation 2), it is apparent that by suitably choosing the support structure dimensions and materials, the effective permeability of the magnetic path may be made to vary with respect to temperature such that the temperature dependency of the Hall output of the generator is substantially eliminated. By the air gap-effective permeability variation technique described above temperature changes in the Hall constant R, in the Hall plate output resistance, as well as in the output circuit resistance in the generator output circuit may be substantially compensated. However, in order to achieve the greatest accuracy possible, it is preferable to insert a negative temperature coefficient resistance in the generator output circuit and to arrange for the air gap and effective permeability variation to compensate for changes in the Hall constant R while the negative temperature coefficient resistance compensates for temperature variation in the Hall plate output resistance and in the output circuit resistance.

The invention is illustrated by way of example wherein:

FIGURE 1 is a section view of an embodiment of the invention.

FIGURE 2 is a section view of the generator looking in the direction of the arrows 2—2 of FIGURE 1.

FIGURE 3 shows the wiring diagram.

Figure 4:
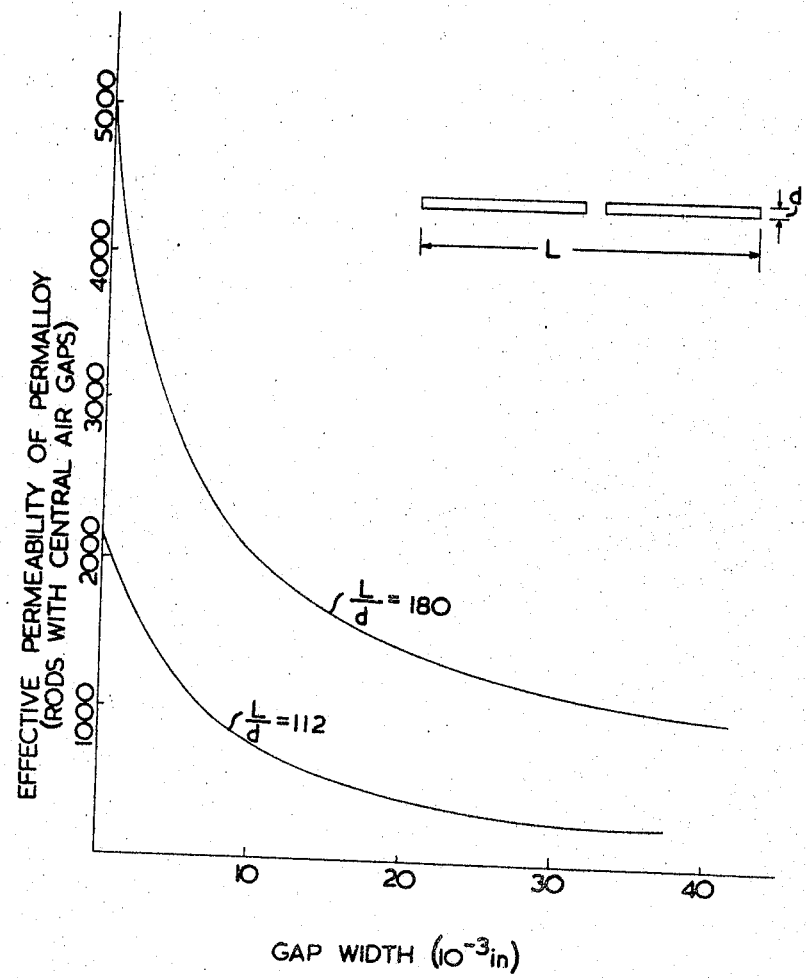
FIGURE 4 is a graph illustrating the variation of effective permeability of a pair of concentrator rods with respect to variation of an air gap therebetween.

Referring first of all briefly to FIGURE 1 there is seen a Hall generator including a Hall plate 13 having concentrating rods 18 and 19 associated therewith. These rods serve to concentrate a component of a magnetic field upon the Hall plate. The concentrating rods 18 and 19 are positioned in axially aligned relationship with each other on opposite sides of Hall plate 13 and are perpendicular thereto and slightly spaced therefrom.

In order to achieve temperature compensation of the Hall plate output in accordance with the present invention, the concentrator rods 18 and 19 are mounted in a specialized structure which is responsive to changes in the temperature of the complete generator assembly. It will be realized that Hall plate temperature is a function of the rate at which heat is conducted therefrom; therefore if the generator assembly is placed in a low temperature environment, the rate of heat transfer away from the Hall plate will increase and the temperature of the latter will decrease. If the generator assembly is placed in a high temperature environment the opposite will occur. Since an increase in the Hall plate temperature results in a decreased output therefrom, due to a decrease in its Hall constant R and an increase in its internal resistance, it is desirable that this same temperature change affecting the Hall plate characteristics be utilized by means which can compensate for the effects of this temperature change. Since the effective permeability of the magnetic path passing through concentrator rods 18 and 19, the air gap therebetween, and the Hall plate 13, is dependent upon the width of the gap between the innermost ends of rods 18 and 19, it is possible to vary the width of the gap in response to temperature change such that the generator output is substantially constant with respect to temperature.

As will be seen hereafter, a substantially temperature independent Hall output is obtained by mounting the concentrator rods 18 and 19 such that the gap therebetween is decreased by a selected amount with a temperature increase and vice versa.

Referring to FIG. 4 it will be seen that the effective permeability of the magnetic path passing through the aligned concentrator rods depends greatly upon the width of the air gap between the adjacent ends of the rods. As explained earlier, the Hall constant R varies with a change in temperature such that the Hall voltage output is not strictly linear with respect to the control current input through the Hall plate or to the field intensity H. In other words, in the equation $$V_z = \left(\frac{R}{d}\right)\mu H I_x + C I_x$$

R must considered to be variable, dependent upon the temperature of the Hall plate. However, if the product of the terms R and $\mu$ in the equation is kept at a constant value throughout the range of operating temperatures, the temperature change in R will be fully compensated for. Since the Hall constant R decreases as the temperature increases, the effective permeability $\mu$ of the magnetic path must be increased such that $\mu \times R$ is substantially constant. This is done by decreasing the gap between said concentrator rods as the ambient temperature is increased. Since the Hall constant for a typical Hall plate is known to vary about ±5% in value from −55° to +70° C. and since the effective permeability $\mu$ of the magnetic path must vary in inverse proportion thereto (i.e., $\mu$ must increase as R decreases or vice versa) the necessary variation in air gap between concentrator rods 18 and 19 within the above ambient temperature ranges may be obtained from a graph similar to that shown in FIGURE 4. The above variation is achieved by means of a specialized structure for mounting the concentrator rods.

When the effective permeability variation is used solely to compensate for changes in R, as set forth above, it is necessary to provide negative temperature coefficient resistance means to compensate for the effects of temperature change in the Hall plate output resistance and in the output circuit resistance. Reference is made more fully hereinafter to such resistance means in the descriptive matter relating to the electrical circuitry of the Hall device.

It should be realized that the effective permeability variation technique is not limited solely to temperature compensation of the Hall constant R, but with suitable modifications, the effective permeability variation with temperature may be chosen such that temperature variation in the Hall plate output resistance and in the output circuit resistance are also compensated for, thus eliminating the need for negative temperature coefficient resistances in the output circuit.

The following discussion will serve to illustrate the above statement. Assuming that a temperature increase takes place which increases the Hall plate output resistance and the resistance in the Hall plate output circuit, then if the power and current output of the generator is to remain constant, the Hall voltage output must be increased in proportion to the resistance increase referred to. Since the resistance variation for a given temperature variation can be calculated, the variation in Hall voltage necessary to maintain constant output current and power may also be determined. Knowing the Hall voltage variation required, the effective permeability variation necessary to overcome the effects of the resistance changes can be calculated, and this latter quantity is then combined with the effective permeability variation necessary to compensate for the changes in the Hall constant R to arrive at the total effective permeability variation required. Knowing the concentrator rod material, the gap variation necessary to achieve temperature compensation may be determined by reference to a graph similar to that shown in FIGURE 4.

Compensation of the Hall constant R, and the output resistance by means of the effective permeability variation alone, is sufficiently accurate for most applications over a limited range of ambient temperature variation. However, in applications requiring great accuracy in the Hall generator output over the full temperature range (−55° C. to +70° C.), temperature compensation by means of the preferred embodiment described wherein the effective permeability variation compensates for changes in the Hall constant R, while negative temperature coefficient resistance means compensate for changes in the Hall plate output and in the output circuit resistance, is recommended.

Referring again to FIGURE 1 it is seen that there is provided a tubular casing 10, the opposing ends thereof being externally threaded for attachment of end caps 11, 12. The end cap 11 comprises a circular disc portion 11a and a circumferential flange portion 11b formed integrally therewith. Flange portion 11b is internally threaded for engagement with one of the externally threaded end portions of the tubular casing 10. An annular recess 11c is provided on the side of disc portion 11a which faces inwardly towards the casing 10, said recess 11c providing a seat for a coil spring 29, the function of the latter being set forth more clearly hereinafter. End cap 11 also carries a central stud 33 having a spherical head 34 such that the latter may be mounted in a spherical socket (not shown) for pivotal mounting of the Hall generator assembly. The opposing end cap 12 includes an internally threaded flange portion 12a which engages the externally threaded end portion of casing 10 opposite to the end of said casing on which end cap 11 is mounted. End cap portion 12b formed integrally with flange portion 12a has a central aperture therein to accommodate a Cannon plug 31 as described hereinafter.

The Hall plate 13 is mounted in a disc shaped block 14 consisting of two semi circular parts 14a, 14b (FIG. 2) which together by virtue of rectangular cut outs therein define a central aperture, the edges of the mounting block facing inwardly of said aperture being provided with grooves 15 for accommodation of the Hall plate 13 within the aperture. Several Hall effect materials are suitable for use in Hall plate 13, for example HR 31, a semiconducting material made by Ohio Semiconductors; an indium arsenide semiconductor material known as SBV–508α Siemens; or an indium arsenide semiconductor material known as SBV–525 Siemens.

The mounting block 14 with the Hall plate 13 mounted therein is located in a plane transverse to the longitudinal axis of casing 10 approximately mid-way of the length of the latter. The mounting block 14 makes contact about its periphery with the casing 10 and is fitted within casing 10 such that said mounting block may be shifted slightly, in a direction axially of the casing 10, by virtue of thermal expansion in several components to be hereinafter described. Electrical energy dissipated as heat in the Hall plate 13 is conducted along the mounting block 14, outwardly thereof to the wall of casing 10, and since overheating of the Hall plate 13 is undesirable, it is apparent that mounting block 14 should preferably be of a material which is a good conductor of heat. Furthermore, since the Hall plate 13 must be electrically insulated from the casing 10 and further components contacting the mounting block, it is apparent that mounting block 14 must be of a material which is a good electrical insulator. Those skilled in the art will be readily able to select a mounting block material or material combinations which possesses both of these characteristics.

The Hall plate mounting block 14 carries on its side facing towards the end cap 12, four terminal pins 39, 40, 41 and 42 (FIG. 2), the pin 42 extending through and protruding on both sides of the block, while on the other side facing the end cap 11 the mounting block carries a pin 43 (FIG. 1). FIG. 3 illustrates the manner in which these pins are connected with the electrical leads and with the Hall plate 13. A standard Cannon plug 31 secured by means of a holder 32 and bolts (not shown) to the end cap 12 interconnects the internal and external parts of the electrical circuits of the Hall generator.

Arranged coaxially within the casing 10 are the concentrating rods 18, 19 which were referred to earlier and which are located one on each side of Hall plate 13. The concentrator rod length and diameter vary in accordance with the rod material selected. For example, concentrator rods of annealed Hy Mu 80 (a high permeability alloy) 30 inches long, with a ⅛ inch diameter are quite suitable for applications requiring high sensitivity. "Permalloy C," the trademark for a well known high permeability nickel-iron alloy, is also very satisfactory in many applications.

Press fitted on the concentrator rod 18 is a flanged sleeve 35 carrying a wound coil 36. Similarly, the concentrator rod 19 carries a flanged sleeve 37 with a wound coil 38 thereon. Coils 36 and 38 are connected in the Hall generator circuit as will be seen hereinafter.

The mounting structure for the concentrator rods 18 and 19 includes spacers 16, 17 and 30, sleeves 20 and 21 and a plurality of other components all as will now be described.

All of the spacers 16, 17 and 30 comprise hollow cylinders and these are disposed within the casing 10 in sliding contact with the inner wall of the latter. Spacers 16 and 17 are disposed on opposing sides of the Hall plate mounting block 14 with their innermost ends abutting opposing sides of the latter. The outer ends of spacers 16 and 17 contact flanged portions 20a, 21a respectively. The flanged portions 20a and 21a are integrally formed on the sleeves 20 and 21.

The sleeves 20 and 21 are, with the exception of their respective flanged portions 20a and 21a, wholly embraced by tubular spacers 16 and 17 respectively, said sleeves 20 and 21 being slidably fitted each in its respective spacer. In order to reduce friction between the sleeves and the spacers, each of the sleeves 20 and 21 have a portion of their respective outer surfaces slightly relieved midway between their flanged portions and their innermost ends. The inner ends of each of sleeves 20, 21 are internally threaded thereby to adjustably accommodate externally threaded collars 24 and 25 respectively. The outer end of sleeve 20 is provided with a lip 20b, the latter defining a recess between the inner wall of casing 10 and sleeve 20 for accommodation of one end of a coil compression spring 29, the other end of said spring 29 being received in the recessed portion 11c in the end cap 11. Said spring 29 exerts a compressive force sufficient to keep the sleeves 20, 21, and spacers 16, 17 and mounting block 14 in firm mutual contact such that the whole assembly is constantly urged towards spacers 30, the latter being interposed between the flange portion 21a of sleeve 21 and the portion 12b of end cap 12.

Concentrator rods 18 and 19 are embraced at their respective inner ends by one of the collars 24 and 25. Split rings 22, 23 are tightly wedged between the respective inner ends of concentrator rods 18, 19, and their respective collars 24, 25 such that each rod with its split ring and collar forms an integral unit. Pins 26 and 26a which are fitted within apertures drilled radially through the wall of respective sleeves 20, 21 and through the wall of collars 24, 25, firmly lock the integral units in preassigned positions within each of the tubes.

The collars 24 and 25 have respective passages 24a and 25a therein and the ring 28 has a passage 28a therein for accommodation of the several electrical leads (not shown in FIGURE 1 for sake of clarity) which are interconnected between the Cannon plug 31 and the Hall plate 13.

The ends of the concentrator rods 18, 19 outwardly of the Hall plate 13 are each supported by rings 27, 28 respectively press fitted within the outer ends of respective sleeves 20, 21. The inside diameter of each ring is slightly greater than the outside diameter of the particular concentrator rod 18, 19 associated therewith so that each of the latter may slide freely therein.

The spacer tubes 16, 17 and 30 are preferably of red brass (85% copper, 15% zinc). The sleeves 20, 21 are preferably of a magnesium alloy (10% Mg, 29% Zn, 59% Al, 2% Mn). The other parts may be made of any suitable material, e.g., casing 10 and caps 11, 12 of aluminum alloy, rings 27, 28 and collars 24, 25 of a reinforced fiber material.

The criterion to be used when selecting the materials for the spacing tubes 16, 17 and the sleeves 20, 21 is that the coefficient of thermal expansion for the sleeves be greater than that of the spacer tubes in the particular embodiment shown, in order that an increase in temperature will cause the gap between the inner ends of the concentrator rods to decrease while a temperature decrease causes the opposite (a gap increase). Those skilled in the art will realize that the relative lengths of the spacers 16 and 17 and the sleeves 20, 21 will be determined to a large extent by the gap variation required in order to achieve the necessary amount of temperature compensation of the Hall output.

As an example, when using a Siemens SBV-525 Hall plate material, the gap between the ends of the concentrator rods is required to vary from a minimum of about .010″ to a maximum of .020″ in response to a temperature variation of +70 to −55° C. in order to achieve the effective permeability variation necessary to balance out temperature variation in the Hall constant R of said Hall plate. Since the variation of effective permeability with respect to gap width is, for practical purposes, almost linear over the range of temperature variation mentioned above, and since the change in R is also substantially linear over this range it will be found that the temperature change in the Hall constant R is substantially compensated for.

In order to visualize that which takes place when the generator is subjected to a temperature change, let it be assumed that a temperature increase takes place in the environment surrounding the generator. As the generator structure becomes warmer, the spacers 16, 17 and 30 increase in length, such increase in length moving mounting block 14 and the sleeves 20, 21 slightly towards end cap 11, with the overall length increase being absorbed by spring 29. Due to the fact that the effective length of each of the sleeves 20, 21 including the inner end portion of concentrator rods 18 and 19 is about equal to the length of the spacer 16, 17 associated therewith and since the coefficient of thermal expansion of the sleeves 20, 21 is greater than that of their respective spacers 16, and 17, said temperature increase will cause the concentrator rods to move more closely towards each other thus narrowing the gap therebetween and increasing the permeability of the magnetic path passing through said Hall plate 13. Upon a temperature decrease, the opposite action takes place, with the spring 29 retaining the concentrator rod mounting assembly components in firm mutual contact during their thermal contraction.

The generator is assembled with a dummy plate (not shown) in place of Hall plate 13. The dummy plate will have a thickness corresponding to the initial gap setting between the inner ends of the concentrator rods 18 and 19. The concentrator rods with their respective collars 24 and 25 mounted thereon are adjusted axially by turning the same within sleeves 20 and 21 until said rods contact the dummy plate. In order to assist in this operation slots 18a, 19a may be provided in concentrator rods 18, 19 respectively thereby to accommodate a suitable tool for adjusting the assembly. The generator is then disassembled taking care that the adjustment of the concentrator rods within the sleeves is not disturbed. Holes are then drilled in the collars 24 and 25 and in the sleeves 20 and 21 and pins 26 and 26a are driven therein such that no rotation of the concentrator rods and their associated collars can take place with respect to the sleeves in which the latter are located. Thereafter the generator is reassembled with mounting block 14 and the Hall plate 13 in place of the dummy plate.

The input to the Hall plate 13 (FIG. 3) is provided by a controlled power source S and is received by the Hall plate through lead 44 having a positive temperature coefficient resistor 45 and a negative temperature coefficient resistor 46 series connected therein, the latter resistor serving to correct the change in input resistance occurring in the Hall plate 13 due to a temperature change in the latter. One end of the coil winding 36 is connected with lead 44 through terminal pin 42, while the other end of said winding is connected through terminal pin 43 to one of the input terminals of the Hall plate 13. The remaining input terminal of the Hall plate 13 is connected through terminal pin 39 to power source S to complete the Hall plate input circuit. The generator output is fed to a load L through series connected positive temperature coefficient resistor 47 and negative coefficient resistor 48 via lead 49, the latter being connected to the output electrodes of Hall plate 13 via the terminal pins 40 and 41, the resistor 48 serving to compensate for changes in the Hall plate output resistance and output circuit resistance due to temperature changes.

The negative temperature coefficient resistances referred to are preferably of an alloy of 15% silver and 85% tellurium. This alloy is unique in that it has an essentially linear temperature coefficient between −70 and +70° C. (the anticipated temperature range of operation of the generator) as well as a high enough temperature coefficient so that a small resistance of this type can cancel positive temperature coefficient variations of much larger resistances, thus permitting a much higher yield, i.e., output current per input ampere oersted, for the Hall device. For further information concerning resistors of the type mentioned above reference is made to: Fans H. T., "Resistance Characteristics of Te and AgTe Alloys," Electrical Eng., vol. 56, pp. 1128–1133, September 1937.

The positive temperature coefficient resistors 45 and 47 referred to above serve to cancel out the effects of the small nonlinearities in the negative coefficient resistors 46 and 48 respectively in that the nonlinearities in these two types of resistors have approximately equal and opposite effects on the performance of the circuit over the temperature range of interest.

The coil 38 disposed about concentrator rod 19 receives a signal from a high frequency alternating source of potential 50 through a resistance 51. The purpose of this coil is to reduce the error due to magnetic remanence of the concentrators upon cycling. These windings are fed by a signal having a frequency sufficiently high (usually in the 10 to 100 cycles/sec. range) such that this portion of signal contribution to the output of the Hall device does not affect the system network being acted upon.

The number of windings in coil 36 disposed about the remaining concentrator rod 18 are chosen such that the coil when properly connected in the Hall input circuit creates a magnetic field which acts to eliminate the component of Hall voltage output arising from the magnetic field of the input to the Hall plate and which is independent of the primary magnetic field.

It should be realized that the dimension of the gap between the concentrator rods 18 and 19 does not change in response to the heat energy emitted by the Hall plate. Since the heat energy generated internally of the Hall plate affects the Hall constant R and the Hall plate resistance, it will be apparent that upon startup and upon a change in the value of the input current to the Hall plate, that a transient heating condition will occur during which the generator will not be temperature compensated. Temperature compensation will take place only when the Hall plate has achieved temperature equilibrium, that is, when the net flow of heat away from the Hall plate reaches a constant value, at which time the temperature differential between the heated Hall plate and the ambient temperature will be substantially constant.

It should also be realized that the generator will not be fully temperature compensated until the temperature of the concentrator rod support structure (which includes casing 10, spacers 16, 17, 30 and tubes 20 and 21) reaches a state of equilibrium. Therefore, if a rapid change in ambient temperature occurs, a period of time which depends upon the thermal capacity of the concentrator rod support structure will elapse before the generator output is fully temperature compensated. In practice, it has been found that the rates of any changes in the generator input current and the ambient temperature are sufficiently small as not to present any real problem.

The Hall generator described herein is useful in many areas and is particularly adapted for use in an aircraft as an integral part of a magnetic anomaly detection system. By virtue of the temperature compensating technique described above, the Hall generator will have an output which is substantially temperature independent over the full range of ambient temperatures to which the generator is exposed.

I claim:
1. In a Hall effect device,
    (A) means defining a magnetic path, said means including:
        (a) a pair of high permeability bodies supported in aligned relation and spaced apart to define a gap therebetween,
        (b) a Hall plate having a pair of opposed faces disposed in said gap between said high permeability bodies and in spaced relation to the latter, said Hall plate producing an output in response to a magnetic field component passing along said magnetic path and through said opposed faces, said Hall plate being exposed in operation to ambient temperature increase and decrease which acts (i) to decrease and increase respectively the Hall constant of proportionality and (ii) to increase and decrease respectively the internal resistance of said Hall plate, thereby tending to vary the Hall plate output,
    the improvement comprising:
    (B) a compensating mechanism operatively associated with said high permeability bodies and responsive to said ambient temperature increase or decrease to move said high permeability bodies towards or away from one another thereby to decrease or increase respectively the spacing between said high permeability bodies by an amount sufficient to vary the effective permeability of said magnetic path to oppose the effects of said temperature increase or decrease on the Hall plate output.

2. The Hall effect device according to claim 1 wherein the compensating mechanism operatively associated with the high permeability bodies includes a pair of elongated members having different coefficients of thermal expansion such as to produce upon temperature change a differential displacement of points of said members and means for transmitting such displacement to one of the high permeability bodies thereby resulting in a corresponding displacement of said high permeability body relative to the Hall plate.

3. The Hall effect device according to claim 2 wherein the compensating mechanism operatively associated with the high permeability bodies includes a further pair of elongated members, the said pairs being respectively disposed on opposite sides of the Hall plate, the differential displacement of points on said further pair being transmitted to the other high permeability body, thereby resulting in a corresponding displacement of said other high permeability body relative to the Hall plate.

4. The Hall effect device according to claim 3 wherein the compensating mechanism operatively associated with the high permeability bodies acts to vary the spacing between the latter so as to vary the effective permeability of said magnetic path by an amount sufficient to fully compensate for the effects of the temperature increase or decrease on the Hall plate output.

5. The Hall effect device according to claim 1 further including a circuit connected across the output of said Hall plate and across a load, said output circuit and load having an output circuit resistance, said circuit having a negative temperature coefficient resistor series connected therein and adapted to further oppose the effects of said temperature increase or decrease on the Hall generator output and on the output circuit resistance.

6. The Hall effect device according to claim 3 further including a circuit connected across the output of said Hall plate and across a load, said output circuit and load having an output circuit resistance, said circuit having a negative temperature coefficient resistor series connected therein and adapted to further oppose the effects of said temperature increase or decrease on the Hall generator output and on the output circuit resistance.

7. The Hall effect device according to claim 1 wherein a coil is disposed about one of said high permeability bodies and a high frequency signal source connected across said coil, and feeding a signal therethrough, thereby to eliminate the effects of magnetic remanence in said high permeability body.

8. The Hall effect device according to claim 7 wherein said high frequency signal source has a frequency of 10–100 cycles per second.

9. The Hall effect device according to claim 3 wherein a coil is disposed about one of said high permeability bodies and a high frequency signal source connected across said coil, and feeding a signal therethrough, thereby to eliminate the effects of magnetic remanence in said high permeability body.

10. The Hall effect device according to claim 7 including a source of potential connected in an input circuit to said Hall plate thereby to provide a flow of current through the latter, said circuit having a negative temperature coefficient resistance which opposes the change in input resistance of the Hall plate due to temperature increase or decrease and a coil the windings of which are serially connected in said input circuit with the windings of the said coil disposed about one of said high permeability bodies.

11. The Hall effect device according to claim 1 wherein each of said high permeability bodies comprise an elongated rod having its inner end closely spaced from one of the opposing faces of the Hall plate, a sleeve means having inner and outer ends surrounding a portion of the length of each rod, means connecting the inner end of each sleeve means to its associated rod adjacent the inner end of the latter, tube means having inner and outer ends surrounding said sleeve means, means preventing relative movement between the outer ends of the sleeve means and the outer ends of said tube means, means preventing relative movement between the inner ends of said tube means, the sleeve means being of a material having a greater coefficient of thermal expansion than the material of said tube means and the length of said sleeve means being chosen relative to the length of the tube means to provide for movement of said elongated rods towards or away from one another in response to said increase or decrease respectively in ambient temperature thereby to cause said effective permeability variation.

12. The Hall effect device according to claim 11 wherein said Hall plate is disposed in a mounting block and wherein the inner ends of said tube means bear on opposing sides of said mounting block thereby to prevent any relative movement between the inner ends of the tube means.

13. The Hall effect device according to claim 12 wherein the outer ends of said sleeve means are provided with flanged portions which abut the outer ends of their associated tube means, and resilient means continually urging the inner ends of the tube means into contact with the mounting block and the flanged portions of the sleeve means into contact with the outer ends of their associated tube means during contraction and expansion caused by ambient temperature changes.

14. A Hall effect device comprising: a magnetic path, constituted by a pair of magnetic field concentrating bodies supported in spaced apart aligned positions, the air gap defined therebetween and a Hall plate supported transversely in said air gap in the path of and responsive to a magnetic field component passing through said magnetic path; and, a temperature compensating mechanism connected to said magnetic field concentrating bodies and adapted to vary the effective permeability of said magnetic path in response to temperature variation affecting said Hall plate such as to oppose the effects of said temperature variation on the output of the Hall effect device.

References Cited

UNITED STATES PATENTS

| | | | |
|---|---|---|---|
| 3,008,083 | 11/1961 | Kuhrt et al. | 323—94 X |
| 3,061,771 | 10/1962 | Planer et al. | |
| 3,320,520 | 5/1967 | Pear | 323—94 X |
| 3,344,850 | 10/1967 | De Forest | 323—94 X |
| 3,365,665 | 1/1968 | Hood | 323—94 X |

FOREIGN PATENTS 1,131,798  6/1962  Germany.

JOHN F. COUCH, *Primary Examiner.*

G. GOLDBERG, *Assistant Examiner.*

U.S. Cl. X. R.

307—278; 324—45; 338—32